United States Patent [19]

Farrell

[11] Patent Number: 4,724,538

[45] Date of Patent: Feb. 9, 1988

[54] EMERGENCY ROADSIDE TELEPHONE COMMUNICATIONS SYSTEM

[75] Inventor: Edward P. Farrell, Merrick, N.Y.

[73] Assignee: Comstock Group, Inc.

[21] Appl. No.: 773,351

[22] Filed: Sep. 6, 1985

[51] Int. Cl.$^4$ ............................................. H01B 1/00
[52] U.S. Cl. .................................... 379/59; 340/539; 455/33
[58] Field of Search ................... 179/2 EB, 5 R, 5 P, 179/6.3 R, 27 G, 2 E; 340/539; 379/59; 455/33

[56] References Cited

U.S. PATENT DOCUMENTS

| | | | |
|---|---|---|---|
| 3,207,849 | 9/1965 | Andrews | 179/5 P |
| 3,549,810 | 12/1970 | Driscoll et al. | 179/5 P |
| 3,582,557 | 6/1971 | Friberg et al. | 179/5 P |
| 4,176,254 | 11/1979 | Tuttle et al. | 179/5 R |
| 4,219,698 | 8/1980 | Birill et al. | 179/5 P |
| 4,577,182 | 3/1986 | Millsap et al. | 340/539 |

Primary Examiner—Robert Lev
Attorney, Agent, or Firm—Kane, Dalsimer, Kane, Sullivan & Kurucz

[57] ABSTRACT

This invention relates to a roadside emergency system. The systems includes a roadside station which has a telephone unit similar to a mobile telephone set for a cellular mobile telephone system. When the unit is activated, it automatically generates radio signals which cause a mobile telephone switching office to dial up an emergency station (such as a highway police station). The office also automatically establishes a channel for voice communication between the roadside station and the emergency station. The roadside station is further provided with a back-up battery and an alarm to prevent tampering.

5 Claims, 5 Drawing Figures

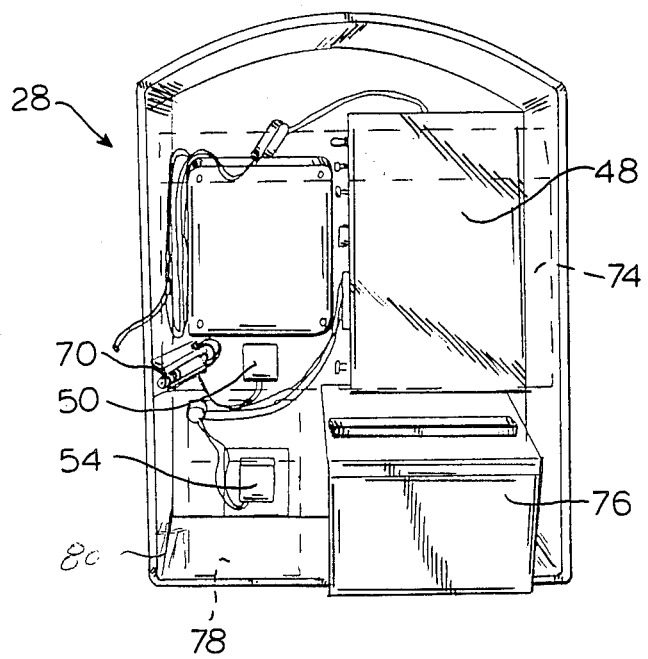

EMERGENCY ROADSIDE TELEPHONE COMMUNICATIONS SYSTEM

BACKGROUND OF THE INVENTION

1. Field of the Invention

This invention pertains to an emergency roadside communication system and to a device for the same, and more particularly to a system with individual devices displaced along the side of a road for contacting a central station, such as a police station, to obtain emergency services.

2. Description of the Prior Art

It is important to provide communication devices along major roads and highways which can be used by motorists, and other members of the public to obtain car services, to notify police of a crime, or an accident, and/or to obtain various other types of emergency services. Such devices are typically placed at regular intervals. However the cost of such devices including installation and an associated interconnection is quite prohibitive, especially since each device is used relatively infrequently.

The present roadside communication systems fall into either of two categories; either radio-type system or hardwire systems. The radio-type systems comprise roadside devices which are two-way radio transceivers. All communications occur over the air at radio frequencies. However, inherently this type of communication is unreliable because it is adversely affected by weather conditions, especially for systems in which there is a large distance between the roadside devices and the central station. Furthermore, due to the advent of CB (citizen band) radios, the number of frequencies available, emergency for emergencies, is very limited. Thus, distance from the central station, dependence on weather conditions, and overcrowding of the radio frequencies render this type of communication undesirable for the intended use.

The second, or wire-type systems comprise roadside devices which are connected to a central station by actual voice-grade wires. The simplest of such systems require a dedicated pair of wires between the central system and each device in a typical star arrangement. While the roadside devices themselves are fairly inexpensive and reliable, the cost of providing, installing and manufacturing the large network of wires is prohibitive. More complicated systems make use of only two or four wires, so that the cost of providing, installing and manufacturing them is reduced drastically compared to the previous system. However, there is an increase of at least one magnitude in the complexity of both the roadside devices and the central system because now the devices are interconnected in a daisy chain, so that one kind of multiplexing scheme is necessary for communication.

A further disadvantage of the prior art systems is that customized equipment must be provided at the roadside and the central station. Differences between particular requirements of each system require customization further increasing the overall cost of the system. Additions to the present systems usually lead to further complications. Frequently new features or devices can be added only by retrofitting whole systems. Furthermore, the uniqueness and complexity of the systems make them hard to troubleshoot and requires special training of the repair personnel.

OBJECTIVES AND SUMMARY OF THE INVENTION

In view of the above, it is a primary objective of the present invention to provide a roadside emergency communication system which does not require special radio channels or dedicated wire lines.

A further objective is to provide a system which makes use of readily available components which may require only slight modification.

An additional objective is to provide a system which is reliable, yet easy to maintain or repair.

Yet another objective is to provide a system which can be readily expanded without extensive modification.

Other objectives and advantages of the system shall become apparent from the following description of the invention.

In order to provide standard two telephone communication between two points, one or both being mobile, special systems have been devised and implemented by the local telephone companies, especially in larger urban areas. These specialized systems are usually known as cellular module telephone systems. These systems operate as follows. A particular geographical area to be serviced is divided into a plurality of cells. Each cell is served by a low-power radio base stations (usually called a cell site) located within the cell. All the cell sites are connected to a central Mobil Telephone Switching Office (MTSO) by several land-based data and voice channels. The MTSO is linked to a standard land-based telephone network. Customers within the cells are provided with mobile telephone equipment capable of exchanging data and voice radio signals with the cell site. More particularly, each site constantly monitors a data control channel. A customer initiates a call by dialing up a desired standard telephone number. The mobile telephone then sends a request for a voice channel and the desired telephone number to the cell site over the control channel. The cell site transmits the request to the MTSO which designates a voice channel for the customer and which dials up the requested number through the link to the telephone system. The designated channel is transmitted to the cell site which retransmits it over the control channel to the mobile phone. In response, the mobile phone tunes its radio transceiver to the designated voice channel and the customer can conduct a regular conversation with the party designated by the telephone number.

Between conversations, the mobile phone is in an idle mode during which it monitors the control channel. When an incoming call is detected by the MTSO designated for one of the mobile phones within its area, the MTSO sends a paging signal to all the site cells which is rebroadcast over the control channel. Then the corresponding channel responds, the MTSO designates a voice channel as described above and two way voice communication may commence.

The present invention makes use of a cellular mobile phone system as described above. It comprises a plurality of roadside stations, each equipped with a transceiver similar to the transceiver of the mobile telephones of the cell in which the station is geographically situated. When a station is activated by a customer, it automatically dials up the telephone number for the local highway police station through the appropriate cell site and MTSO thereby establishing two-way voice communication therewith.

BRIEF DESCRIPTION OF THE DRAWINGS

FIG. 5 shows a rear view of the box of FIG. 2.

DETAILED DESCRIPTION OF THE INVENTION

Figure 1:
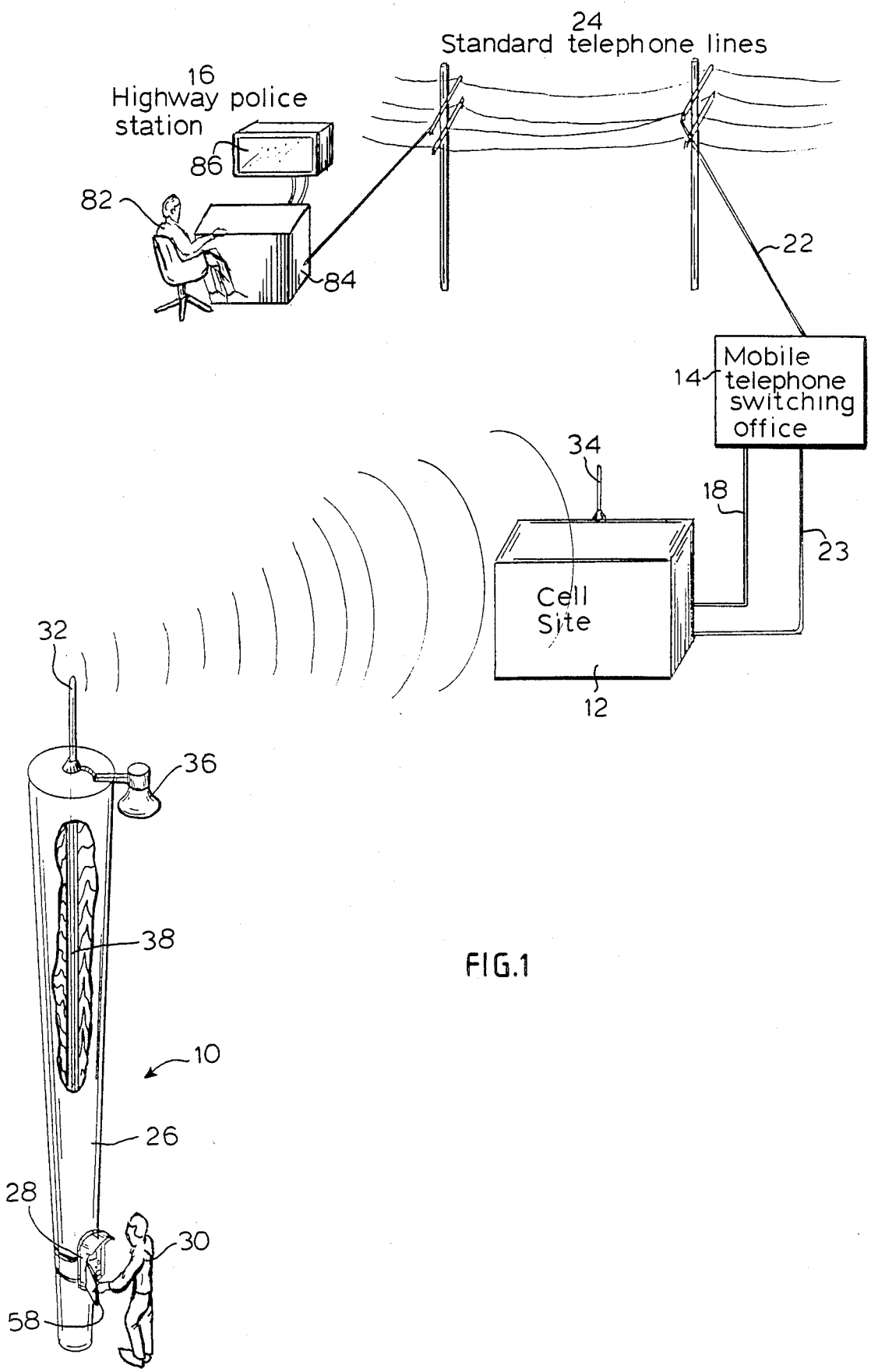
FIG. 1 shows the elements of a roadside emergency telephone system in accordance with the present invention, in somewhat schematic form.

An emergency roadside telephone system, as shown in FIG. 1, comprises a roadside station 10, geographically located within a cell of a cellular mobile phone system, a cell site 12 an MTSO 14 and a standard police station 16. The cell site 12 is connected to the MTSO 14 by land-based data channels 23 as well as voice channels 20. Furthermore MTSO 14 is coupled by telephone link 22 to telephone lines 24 which can be used to contact any standard telephone equipment, including equipment at highway police station 16. Of course, between MTSO 14 and police station 16 there may be one or more telephone switching devices which have been omitted for the sake of simplicity.

The roadside station 10 comprises a pole 26 which supports a communication box 28 positioned for easy access by a person 30, a radio antenna 32 mounted on top of the pole for exchanging radio signals with an antenna 34 of the cell site, and an intrusion alarm siren 36. The antenna 32 and siren 36 are connected to box 28 by a plurality of wires 38 which may be run through the pole 38 (if it is hollow) or alongside it.

Pole 26 may be provided especially for supporting box 28. Preferably, however, pole 26 is a standard utility pole carrying other utility equipment such as lights, power communication lines, to reduce costs. If the pole supports a light (not shown) for illuminating the road, the power supply to the light may be shared with the box 28.

Figure 2:
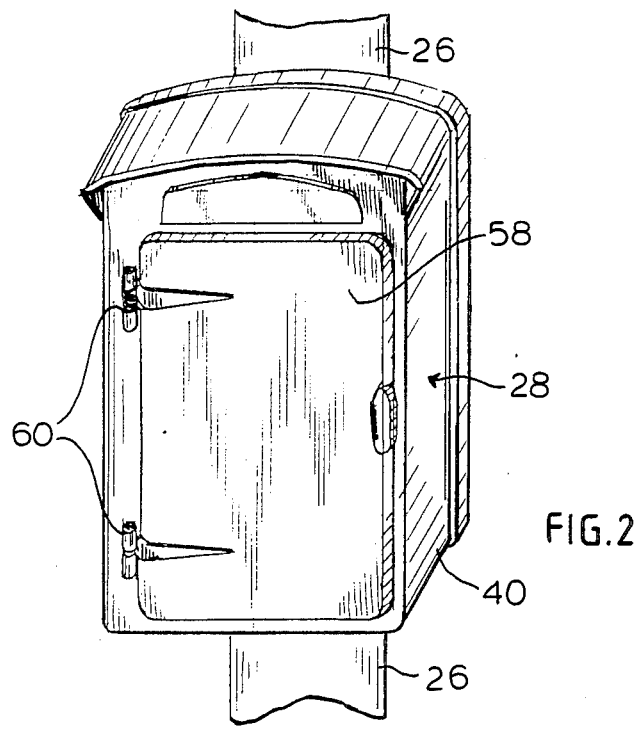
FIG. 2 shows a communication box of the system of FIG. 1.
Figure 3:
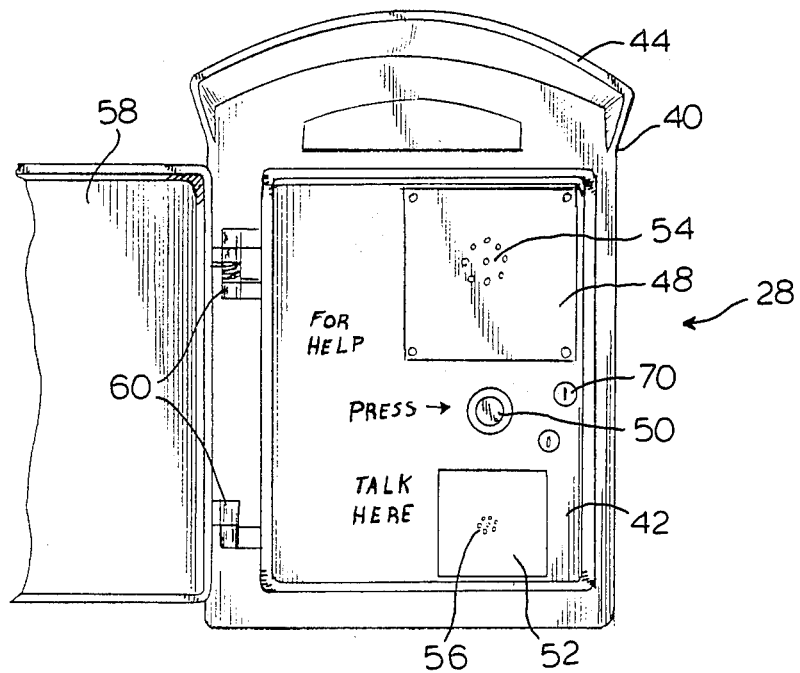
FIG. 3 shows the box of FIG. 2 with its access door in an open position.

Referring now to FIGS. 2 and 3, communication box 28, is made of a very heavy gauge metal such as six gauge sand cast aluminum. The box comprises a body 40 with a front face 42. An overhand 44 is provided to protect the front face from the elements. Behind the front face and attached thereto is a speaker 48, a push-button 50, which may be activated from outside the box, and a microphone 52. The speaker 48 and the microphone 52 covered by grills 56, 56 respectively provided as a protection means against vandalism. The grills are internally mounted to provide an offset baffle behind the cast grillwork of the box. The speaker 48, push-button 50 and microphone 52 are protected by an access door 58. The door 58 is hingedly connected to box front face 42 by hinging means 60. This door is closed by spring action, the springs 61 being located at the hinging 60 as shown.

Figure 4:
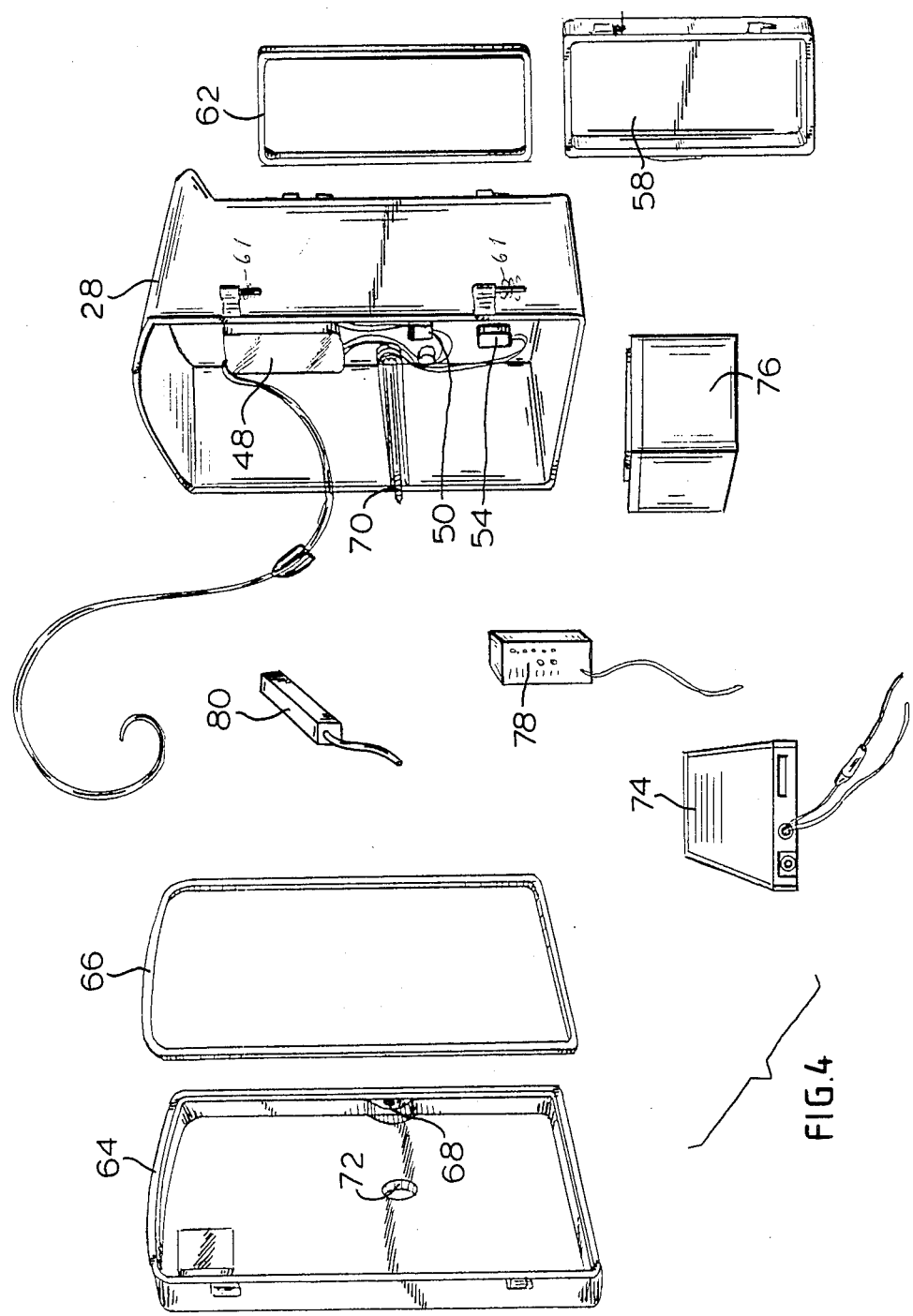
FIG. 4 shows an exploded view of the box of FIG. 2.

As shown in FIG. 4, a gasket 52 is used between the access door and the front face of the box to keep moisture away. FIGS. 4 and 5 also show the remaining components of the box 28. The box is provided with a rear wall 64 attached to the box through a second gasket 66. The rear wall is provided with a threaded hole 68. A nut 70 extends from the front face 42 of the box and extends through the box for engaging the threads of hole 68.

Thus after the rear wall 64 has been secured to pole 26 the box may be attached to its rear wall by rod lock 70. Furthermore, rear wall 64 is provided with a through-hole 72 for wires 38 described above.

Within the box, in addition to the speaker 48, push-button 50, and microphone 52, there is a telephone unit 74, a battery 76 and a battery charger. Preferably, the box 28 is connected to a standard 120 vac 60 cycle supply. This supply is fed to battery charger 78. The battery charger provides power to the telephone unit 74 and a trickle charge to battery 76 in a conventional manner. The battery is selected so that if the a.c. power supply is interrupted, it can provide sufficient power to the telephone unit for up to sixteen hours.

Finally, a motion sensory device 80 is provided as a means of detecting tampering. The motion sensor receives power from battery charger 78 and when it senses motion, it activates siren 36 to prevent damage to the box.

Mobile telephones are available for use in automobiles which provide two-way voice communication through a cellular telephone system as described above. One such unit is the one manufactured by OKI ADVANCED COMMUNICATIONS, under Model No. B2J8Q5-UM1043B. Other similar devices are available from Fujitsu and Motorola. One common feature of the mobile telephone sets is that the customer first dials the desired telephone number on a handset which number is stored in a memory of the set, and then activates a SEND button. The hand-set is readily disconnectable from the telephone set. The telephone unit 74 is similar to a standard mobile telephone except for the following modifications. First, the telephone number of highway police station 16 is stored in the unit memory, and the hand-set is removed. Secondly, the push-button 50 is connected to a unit to simulate the activation of the SEND button on the hand-set.

The operation of the system is obvious from the above description. Referring to FIG. 1, a customer 30 desiring service opens access door 58 of box 28 and pushes button 50. Push-button 50 activates the telephone set, which contacts site cell 12 over the control channel requesting a voice channel and sending the telephone number of highway police station 16. After the voice channel is designated by MTSO 14, telephone unit 76 tunes its transceiver to the channel. Meanwhile MTSO 14 dials the number of the police station 16 thereby completing a voice path between customer 30 and the police station. At the police station, an attendant 82 responds to the call from customer 30. Optionally, the attendant 82 may be provided with a command console 84 and a display 86 which may be used to determine the location of the customer.

Of course, at all times, and independent of the operation of roadside station 10, cell site 12 and MTSO continue their normal operation by servicing various other mobile telephone sets within the cell and/or other roadside stations.

Obviously, numerous modifications may be made to the invention without departing from the scope of of the invention as defined in the appended claims.

What is claimed is:

1. A roadside emergency telephone system comprising:
   a mobile telephone switching office dedicated to a geographic service area and divided into a plurality of cells, said office being connected to a telephone network by a telephone link;

a cell site located within said one of said cells connected by data and voice channels to said office and provided for transmitting and receiving signals over said channels and for transmitting radio signal channels; and a roadside station located within said one cell and provided for selectively generating, in response to a user's nonautomatic single pushbutton input, radio request signals corresponding to an emergency telephone number and for exchanging radio human voice signals with said cell site;

said cell site being further provided to translate the radio request signal from said roadside station into digital request signals for said office; and said office being provided to automatically dial said emergency number in response to said digital request signals, said office being further provided to assign a voice channel for communication between said telephone network and roadside station and wherein said cell site is further provided to receive data control messages from said office indicative of said voice channel and to transmit data control messages with voice radio messages.

2. The system of claim 1 wherein said roadside station comprises a telephone unit for translating radio voice signals into audible signals and audible signals into radio voice signals, said telephone unit including a transceiver which is tuned to the channel in response to said radio control signals.

3. The station according to claim 1 further comprising a backup battery for emergency power for the telephone unit.

4. The station according to claim 3 further comprising a battery charger for trickle charging said battery.

5. The station according to claim 4 further comprising alarm means for generating an audible alarm when a sealed box is disturbed, and comprising said sealed box which contains a speaker, a microphone, a pushbutton, and a telephone unit for generating said radio request signals corresponding to said emergency telephone number when said pushbutton is activated, said telephone unit being connected to said speaker and said microphone for wireless telephone communication between a person at said road station and said cell site.

* * * * *